(12) United States Patent
Shikoda et al.

(10) Patent No.: US 10,229,539 B2
(45) Date of Patent: Mar. 12, 2019

(54) COMPONENT ASSEMBLY WORK SUPPORT SYSTEM AND COMPONENT ASSEMBLY METHOD

(71) Applicant: KAWASAKI JUKOGYO KABUSHIKI KAISHA, Kobe-shi, Hyogo (JP)

(72) Inventors: Shigekazu Shikoda, Akashi (JP); Naohiro Nakamura, Akashi (JP); Shinichi Nakano, Suita (JP); Masahiko Akamatsu, Himeji (JP); Shingo Yonemoto, Kakogawa (JP); Daisuke Tokai, Akashi (JP); Takashi Koumoto, Kakogawa (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 0 days.

(21) Appl. No.: 14/893,126

(22) PCT Filed: Apr. 23, 2014

(86) PCT No.: PCT/JP2014/061405
§ 371 (c)(1),
(2) Date: Nov. 23, 2015

(87) PCT Pub. No.: WO2014/188836
PCT Pub. Date: Nov. 27, 2014

(65) Prior Publication Data
US 2016/0125654 A1 May 5, 2016

(30) Foreign Application Priority Data

May 22, 2013 (JP) .................................. 2013-107887

(51) Int. Cl.
*G06T 19/00* (2011.01)
*G06T 19/20* (2011.01)
(Continued)

(52) U.S. Cl.
CPC ........ *G06T 19/006* (2013.01); *G02B 27/0093* (2013.01); *G02B 27/0101* (2013.01);
(Continued)

(58) Field of Classification Search
None
See application file for complete search history.

(56) References Cited

U.S. PATENT DOCUMENTS

2006/0274327 A1* 12/2006 Bae .................... G01B 11/24
356/601
2011/0242134 A1* 10/2011 Miller .................. G06T 19/006
345/633

FOREIGN PATENT DOCUMENTS

JP 2002-006919 A 1/2002
JP 2003-303356 A 10/2003
(Continued)

OTHER PUBLICATIONS

Zauner et al. (Authoring of a Mixed Reality Assembly Instructor for Hierarchical Structures, IEEE, 2003).*
(Continued)

*Primary Examiner* — Kyle Zhai
(74) *Attorney, Agent, or Firm* — Oliff PLC

(57) ABSTRACT

The system includes imaging unit which images a work space at a viewpoint position in a visual line direction of a worker together with an other component to which one component is to be installed, a position attitude information obtaining unit which obtains position attitude information which indicates relative position attitude relation between viewpoint of the worker and other component in the work space, a virtual image generating unit which generates virtual image of an actual shape of the one component at the viewpoint position in the visual line direction of the worker based on position attitude information, an image composing unit which generates composite image by superimposing (Continued)

virtual image on a real image in the work space imaged by the imaging unit, and display unit which displays composite image. According to the system, efficiency of component assembly work can be considerably improved by using mixed reality technology.

10 Claims, 7 Drawing Sheets

(51) Int. Cl.
  *G02B 27/01* (2006.01)
  *G06Q 10/06* (2012.01)
  *G02B 27/00* (2006.01)
(52) U.S. Cl.
  CPC ..... *G02B 27/017* (2013.01); *G06Q 10/06316* (2013.01); *G06Q 10/06395* (2013.01); *G06T 19/20* (2013.01); *G02B 2027/014* (2013.01); *G02B 2027/0138* (2013.01); *G02B 2027/0141* (2013.01); *G02B 2027/0178* (2013.01); *G02B 2027/0181* (2013.01); *G02B 2027/0187* (2013.01); *G06T 2219/2008* (2013.01)

(56) References Cited

FOREIGN PATENT DOCUMENTS

| | | |
|---|---|---|
| JP | 2005-107968 A | 4/2005 |
| JP | 2005-293141 A | 10/2005 |
| JP | 2008-293209 A | 12/2008 |
| JP | 2009-069954 A | 4/2009 |
| JP | 2012-043396 A | 3/2012 |
| JP | 2012-113418 A | 6/2012 |

OTHER PUBLICATIONS

Raghavan et al. (Interactive Evaluation of Assembly Sequences Using Augmented Reality, IEEE, vol. 15, No. 3, Jun. 1999).*
Tang et al. (Comparative Effectiveness of Augmented Reality in Object Assembly, Apr. 5-10, 2003).*
Jul. 15, 2014 Search Report issued in International Patent Application No. PCT/JP2014/061405.
Nov. 24, 2015 International Preliminary Report on Patentability issued in International Patent Application No. PCT/JP2014/061405.

* cited by examiner

COMPONENT ASSEMBLY WORK SUPPORT SYSTEM AND COMPONENT ASSEMBLY METHOD

TECHNICAL FIELD

The present invention relates to a component assembly work support system for supporting assembly work of components using a mixed reality technology and a component assembly method using the system.

BACKGROUND ART

Conventionally, in assembly work of components for manufacturing structures or the like, components (workpieces) to be combined with each other are abutted in advance to each other before the assembly work is performed so as to confirm their assembly checking whether they can be assembled without problem, or they can be assembled easily.

However, when components are too large to be moved easily or when components to be combined with each other are respectively produced and stored in different locations, it is extremely difficult or impossible to confirm their assembly before the assembly work is performed.

Therefore, problems are found after starting actual assembly work, and therefore correction work of components are required so that the assembly work needs to be temporarily stopped. When the assemble work is temporarily stopped so as to perform the correction work of components in this way, a delay occurs in processes.

In order to avoid such a situation, for example, it can be considered that conditions of an acceptance inspection (the number of inspection items, and the like) when accepting components manufactured in another factory are made stricter than they are now so as to find problems upon acceptance of components. Or, it can be also considered that the inspection conditions upon shipping at another factory are made stricter than they are now.

However, there is a problem that, if the inspection conditions upon shipping or accepting are made too strict, inspection cost increases. Also, there is a case that inspection facilities (such as dimension measuring unit) are not installed in another factory in the first place.

Also, generally, an assembly procedure or a work instruction is used for the assembly work. They are often described in paper based figures or writing. Also, recently, interactive contents, which are easy to understand using three-dimensional figures or videos, are being used by utilizing PC or a tablet terminal.

However, as a worker is engaged in work, putting the assembly procedure or work instruction beside him/her and checking the contents, the distance of a visual line movement of the worker becomes larger, and therefore generating useless motions.

Also, even when the contents are devised, the worker has to work while comparing the instruction contents with actual objects yet, and therefore requiring the worker to understand figures and writing in order to understand the contents.

As a result, there is a problem that physical or mental burden on the worker increases.

By the way, recently, a mixed reality (MR) technology that an image of a virtual space is superposed on an image of a real space at an optional viewpoint and a composite image obtained in this manner is presented to an observer is attracting attention as an image technology for integrating the real world with the virtual world seamlessly in real time (Patent Documents 1-4).

RELATED ART DOCUMENTS

Patent Documents

[Patent Document 1] Japanese Patent Application Laid-Open No. 2005-107968
[Patent Document 2] Japanese Patent Application Laid-Open No. 2005-293141
[Patent Document 3] Japanese Patent Application Laid-Open No. 2003-303356
[Patent Document 4] Japanese Patent Application Laid-Open No. 2008-293209

SUMMARY OF INVENTION

Problems to be Solved by the Invention

Then, an object of the present invention is to provide a component assembly work support system capable of solving the above-mentioned problems in component assembly work by using the mixed reality technology so as to considerably improve work efficiency, and a component assembly method using the system.

Means for Solving the Problems

In order to achieve the objects above, the present invention is a component assembly work support system for supporting a component assembly work, including: an imaging unit configured to image a work space at a viewpoint position in a visual line direction of a worker together with an other component to which one component is to be installed; a position attitude information obtaining unit configured to obtain a position attitude information which indicates a relative position attitude relation between a viewpoint of the worker and the other component in the work space; a virtual image generating unit configured to generate a virtual image of an actual shape of the one component at the viewpoint position in the visual line direction of the worker based on the position attitude information; an image composing unit configured to generate a composite image by superimposing the virtual image on a real image in the work space imaged by the imaging unit; and a display unit configured to display the composite image.

Also, it is preferable that the virtual image generating unit generates the virtual image based on a three-dimensional actual shape data of the one component obtained by a three-dimensional scanner.

Also, it is preferable that the position attitude information obtaining unit has a marker for mixed reality installed temporarily in a predetermined relative position with respect to a reference point on the other component.

Also, it is preferable that the position attitude information obtaining unit has a position direction measuring device configured to measure the viewpoint position and the visual line direction of the worker and a position of the workpiece.

Also, it is preferable that the component assembly work support system further includes an assembly procedure information generating portion configured to generate an assembly procedure information regarding a component assembly procedure, the assembly procedure information generated in the assembly procedure information generating portion being incorporated into the composite image generated by the image composing unit.

In order to achieve the above-mentioned objects, the present invention is a component assembly method using a component assembly work support system for supporting a component assembly work, including: an imaging step which images a work space at a viewpoint position in a visual line direction of a worker together with an other component to which one component is to be installed; a position attitude information obtaining step which obtains a position attitude information which indicates a relative position attitude relation between a viewpoint of the worker and the other component in the work space; a virtual image generating step which generates a virtual image of an actual shape of the one component at the viewpoint position in the visual line direction of the worker based on the position attitude information; an image composing step which generates a composite image by superimposing the virtual image on a real image in the work space imaged in the imaging step; and a display step which displays the composite image.

Also, it is preferable that the position attitude information obtaining step includes a marker installing step which temporarily installs a marker for mixed reality in a predetermined relative position with respect to a reference point on the other component.

Also, it is preferable that a virtual image of an actual shape of the one component is fitted to a real image of the other component in the composite image projected in the display step in order to determine a quality of assembly of the one component and the other component.

Also, it is preferable that the component assembly method further includes an assembly procedure information generating step which generates an assembly procedure information regarding a component assembly procedure, the assembly procedure information generated in the assembly procedure information generating step being incorporated into the composite image generated in the image composing step.

Advantageous Effect of the Invention

By the component assembly work support system and the component assembly method using the system according to the present invention, assembly can be checked, without the need to abut actual components to each other, by using the mixed reality technology, and therefore work efficiency of component assembly can be considerably improved.

EMBODIMENT OF THE INVENTION

Figure 1:
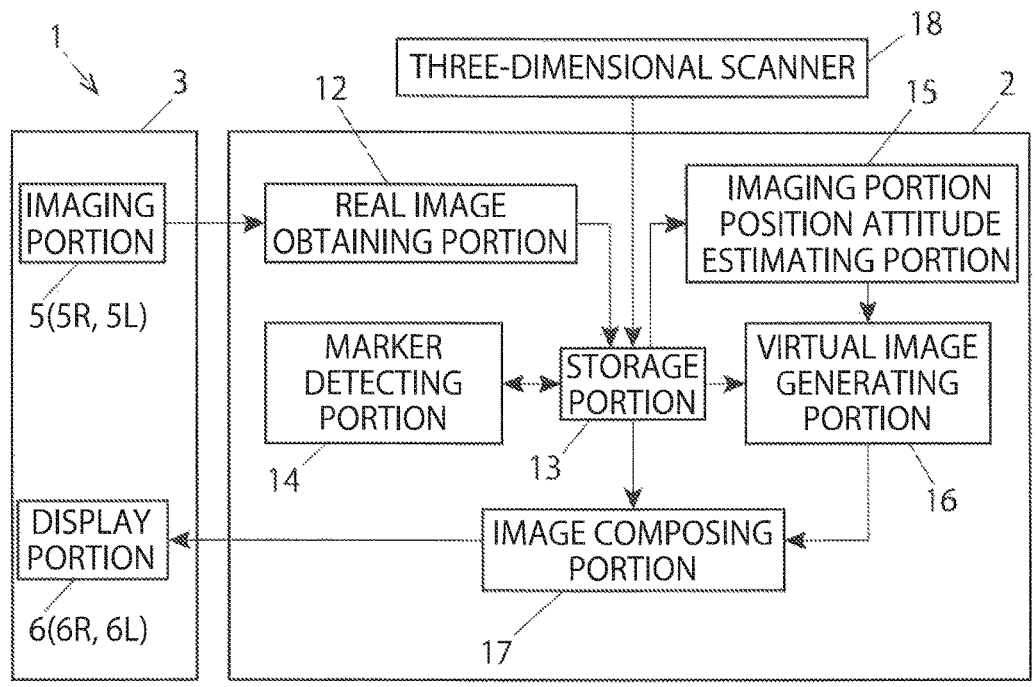
FIG. 1 is a block diagram illustrating a schematic configuration of a component assembly work support system according to an embodiment of the present invention.

Hereunder, the component assembly work support system and the component assembly method using the system according to an embodiment of the present invention will be described.

Note that, although component assembly work to be supported by the system is typically component assembly work for manufacturing a boiler and other large-sized structure, other than that, the system can support various component assembly work for assembling a plurality of components so as to manufacture a finished product.

As the component assembly work support system according to the embodiment uses the mixed reality technology, first, the mixed reality technology will be briefly explained.

As previously mentioned, the mixed reality technology is a video technology which superimposes an image of a virtual space on an image of a real space at an arbitrary viewpoint and presents a composite image obtained by this to an observer, integrating the real world with the virtual world seamlessly in real time.

Namely, the mixed reality technology provides an observer with a composite image obtained by composing a real space image and a virtual space image generated according to a viewpoint position and a visual line direction of the observer. And, it can have the observer perceive the scale of a virtual object by the sense of actual dimension so as to have the observer feel that the virtual object actually exists in the real world.

The mixed reality technology enables the observer to see computer graphics (CG) from an optional position or angle by actually moving, not by operating the same with a mouse or a keyboard. Namely, it is possible that CG is placed in a designated place by an image positioning technology and the CG is seen from various angles using a see-through type head mount display (HMD), for example.

In order to express a mixed reality space (MR space), it is necessary to obtain a relative position attitude relation between a coordinates system in the real space to be a reference determining the position attitude of a virtual object to be superimposed in the real space and a coordinate system of an imaging area (camera coordinate system)

For example, what utilizes a magnetic sensor, an optical sensor, or an ultrasonic sensor, or what utilizes a marker, a gyro, or the like can be given as an appropriate image positioning technology therefore.

Here, the marker (also called "land mark") is an index used for positioning an image. The position attitude of a camera can be estimated by image processing by imaging the marker arranged in the real space with a camera (imaging device) mounted on HMD.

Namely, the marker having a predetermined visual feature in a known three-dimensional coordinates in the real space, and the marker included in the real image is detected, and the position attitude of the camera (imaging device) is calculated from a two-dimensional image position of a constitutional element (center or vertex of the marker) of the detected marker and the known three-dimensional coordinates.

The component assembly work support system of the embodiment utilizes the above-mentioned mixed reality technology, and hereunder, the configuration will be described referring to FIGS. 1 to 4.

Figure 2:
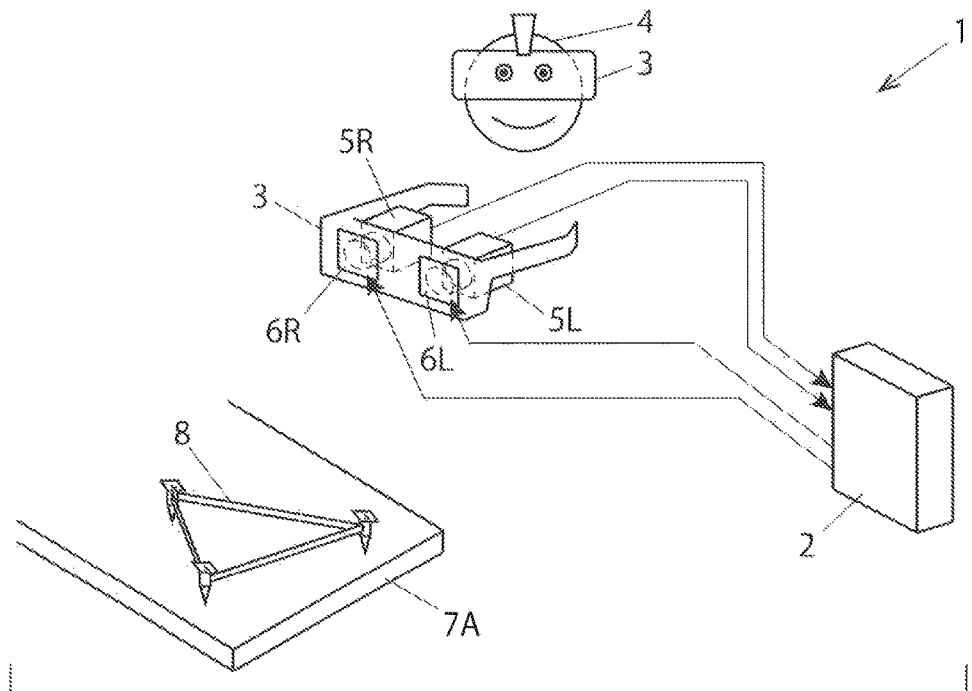
FIG. 2 is a schematic view illustrating the schematic configuration of the component assembly work support system in FIG. 1.

As illustrated in FIGS. 1 and 2, a component assembly work support system 1 according to the embodiment has a system body 2 and a head mount display (HMD) 3 which performs data communication with the system body 2, and a marker member 4.

The system body 2 of the component assembly work support system 1 is configured by a computer having CPU, RAM, ROM, an external storage device, a storage medium drive device, a display device, an input device, or the like.

As illustrated in FIG. 2, a HMD 3 having an imaging portion 5 and a display portion 6 is mounted on the head of a worker 4. Two pairs of the imaging portion 5 and the display portion 6 are provided. The imaging portion 5R and the display portion 6R are for the right eye, and the imaging portion 5L and the display portion 6L are for the left eye. By the configuration, a parallax image can be presented to the right eye and the left eye of the worker 4 who mounts the HMD 3 on his/her head, and a MR image (composite image) can be displayed three-dimensionally.

In a marker installing step, the imaging portion 5 of the HMD 3 images a marker member 8 for MR installed temporarily on a first component (workpiece) 7A and also images the first component 7A (imaging step). The marker member 8 is to be installed in a predetermined relative portion with respect to a reference point on the first component 7A.

Figure 3:
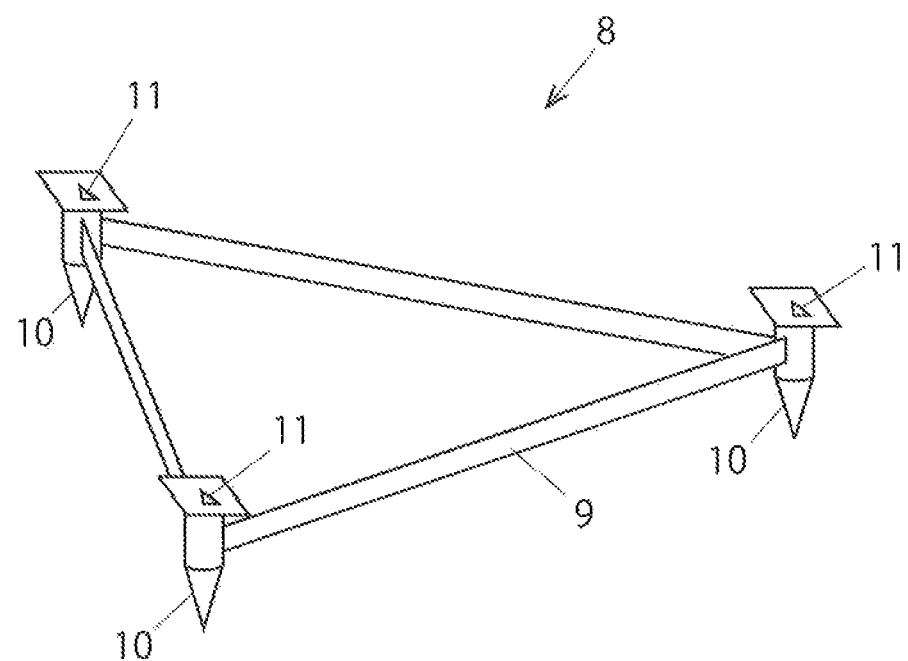
FIG. 3 is an enlarged perspective view illustrating a marker member of the component assembly work support system in FIG. 1.

As illustrated in FIG. 3, the marker member 8 according to the embodiment has a triangle frame portion 9, each supporting portion 10 provided on the lower surface of each vertex of the triangle frame portion 9, and each marker for mixed reality 9 provided on the upper surface of each vertex of the triangle frame portion 9.

As illustrated in FIG. 1, a real image in the real space obtained by the imaging portion 5 of the HMD 3 is input to a real image obtaining portion 12 of the system body 2. The real image obtaining portion 12 outputs data of the input real image to a storage portion 13 of the system body 2.

The storage portion 13 holds necessary information for a presentation processing of a MR image (composite image) and reads out and updates the information according to a process.

Also, the system body 2 has a marker detecting portion 14 for detecting the marker 11 provided in the marker member 8 from the real image held by the storage portion 13.

Next, a detection result of the marker 11 of the marker member 8 arranged on the first component 7A as a real object is sent to an imaging portion position attitude estimating portion 15 from the marker detecting portion 14 via the storage portion 13. The imaging portion position attitude estimating portion 15 estimates a position attitude of the imaging portion 5 of the HMD 3 in the object coordinate system of the first component 7A itself as the reference coordinate system based on the detection result of the marker 11.

Here, the marker member 8, the marker detecting portion 14, and the imaging portion position attitude estimating portion 15 configure the position attitude information obtaining unit in the component assembly work support system 1.

The position attitude of the imaging portion 5 of the HMD 3 estimated by the imaging portion position attitude estimating portion 15 is sent to a virtual image generating portion 16. The virtual image generating portion 16 generates a three-dimensional virtual image of the other component (workpiece) 7B seen from the position attitude of the imaging portion 5 based on the position attitude of the imaging portion 5 sent from the imaging portion position attitude estimating portion 15, namely the viewpoint position and the visual line direction of the worker 4 (virtual image generating step).

Here, in the component assembly work support system 1 according to the embodiment, a virtual image 30V of a second component, which is to be mounted on the first component 7A, is generated based on the data from a three-dimensional scanner 18 in the virtual image generating portion 16.

Figure 4:
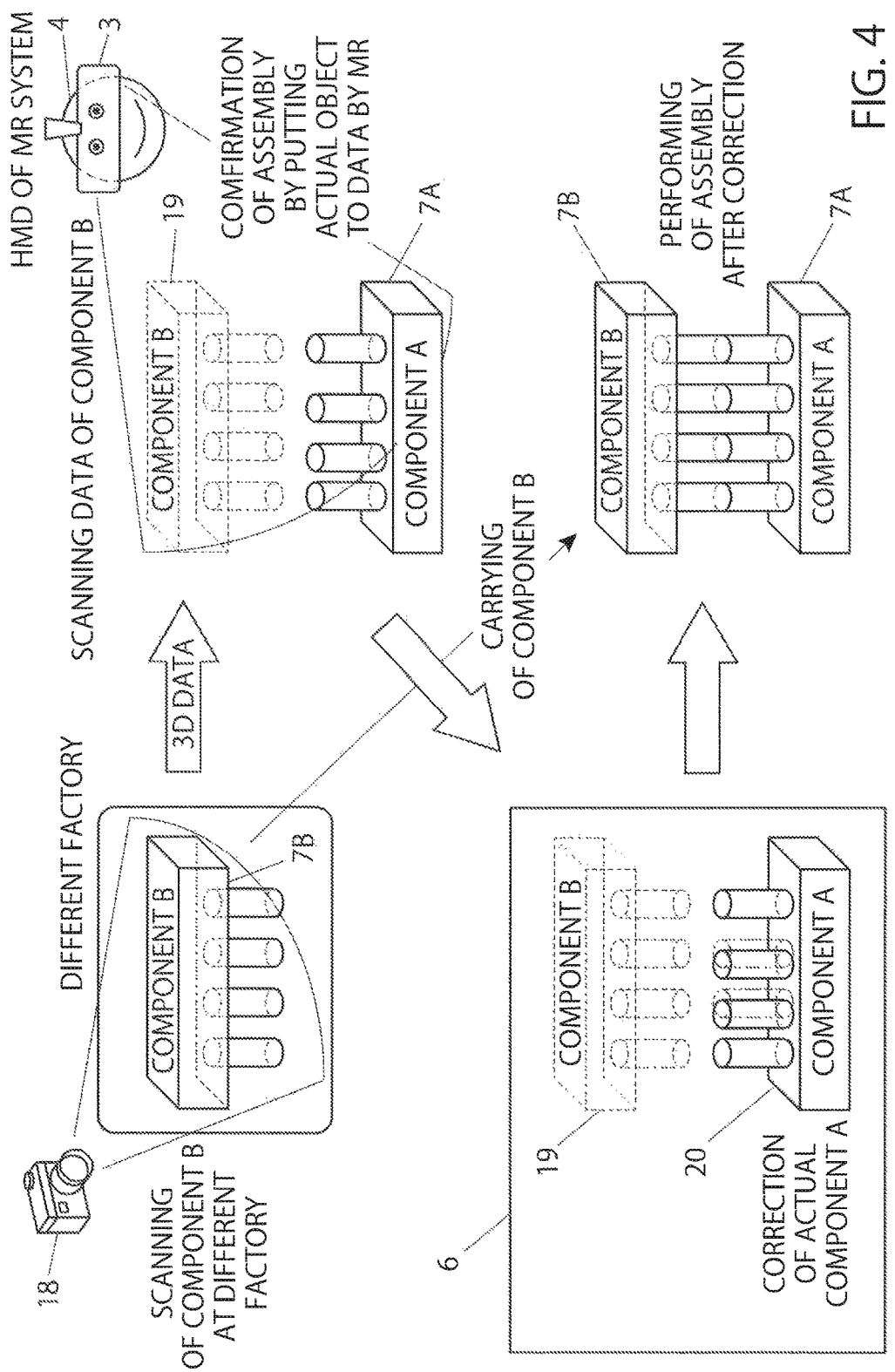
FIG. 4 is a schematic view illustrating a series of assembly steps of examining, modifying as needed, and mounting a component, using the component assembly work support system in FIG. 1.

More specifically, as illustrated in FIG. 4, the second component 7B is measured three-dimensionally by the three-dimensional scanner 18 so as to obtain the three-dimensional actual shape data of the second component 7B. At this time, the second component 7B may be stored in a different factory from a factory for manufacturing the first component 7A as an object on which the second component 7B is to be mounted.

Next, the three-dimensional actual shape data of the second component 7B obtained by the three-dimensional scanner 18 is sent to the storage portion 13 of the system body 2 and stored therein. Then, the virtual image generating portion 16 generates a virtual image 19 of the second component 7B based on the three-dimensional actual shape data of the second component 7B stored in the storage portion 13.

Namely, the virtual image 19 of the second component 7B generated in the virtual image generating portion 16 is not a virtual image regarding an ideal shape of the second component 7B but a virtual image regarding the real shape of the actual second component 7B. Accordingly, the virtual image of the second component 7B shows the actual shape affected by machining error, mounting error, distortion, deformation, processing, or the like.

The virtual image 19 of the second component 7B generated in the virtual image generating portion 16 is sent to an image composing portion 17 of the system body 2. The image composing portion 17 superimposes the virtual image 19 of the second component 7B sent from the virtual image generating portion 16 on the real image of the first component 7A held by the storage portion 13 so as to generate the MR image (composite image) (image composing step).

The MR image (composite image) generated in the image composing portion 17 is output to the display portion 6 of the HMD 3 (display step). Thereby, the MR image that the image of the real space according to the position attitude of the imaging portion 5 of the HMD 3 and the image of the virtual space are superimposed mutually is displayed on the display portion 6 of the HMD 3, enabling the worker 4 wearing the HMD 3 on his/her head to experience the mixed real space.

Then, as illustrated in FIG. 4, the worker 4 puts the virtual image 19 regarding the real shape of the second component 7B displayed in the MR image to the real image 20 of the first component 7A displayed in the MR image as well so as to determine the quality of assembly of the components.

If the worker 4 judges that there is a problem with assembly of the both components after putting the virtual image 19 regarding the actual shape of the second component 7B to the real image 20 of the first component 7A, he/she modifies one of or both first component 7A and the second component 7B so as to secure assembly of the both components.

The work for securing assembly can be performed even when the first component 7A and the second component 7B are not at the same site (factory), but they are at different sites (factories) respectively.

When assembly of the first component 7A and the second component 7B is secured, the second component 7B is carried into the factory where the first component 7A is stored so as to assembly the both components. At this time, assembly of the both components is already secured as stated above.

Figure 9:
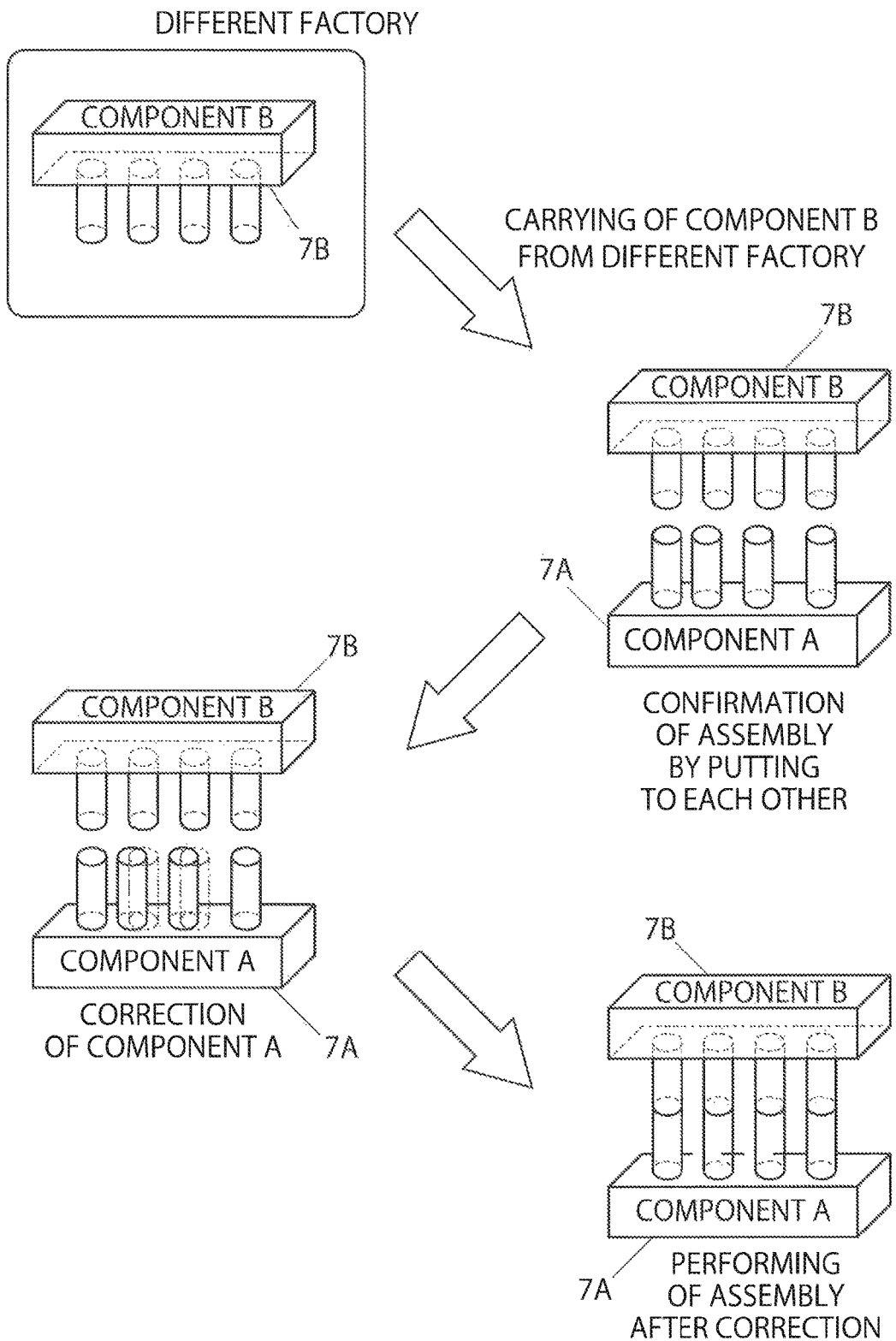
FIG. 9 is another schematic view illustrating conventional component assembly work.

In contrast, in a conventional assembly method illustrated in FIG. 9, first, the second component 7B manufactured in another factory is carried into a factory where the first component 7A is stored, and the both actual components are put to each other there.

Then, when there is a problem with assembly of the both components, one of or both the first component 7A and the second component 7B is/are modified so as to secure assembly. And after that, the both components are assembled.

As stated above, in the conventional assembly method, actual components are put to each other of an actual assembly work so as to check assembly, and therefore, when there is a problem with assembly, the assembly work has to be interrupted and work efficiency declines.

On the other hand, by the component assembly work support system 1 according to the embodiment, assembly of the both component can be checked by putting the virtual image 19 regarding the actual shape of the second component 7B to the real image 20 of the first component 7A.

Therefore, assembly of the both components can be checked even when the first component 7A and the second component 7B are at different sites respectively. Also, even when components are too large to be moved easily, assembly of the components can be checked without moving the components.

In this respect, by the component assembly support system 1 according to the embodiment, the virtual image 19 regarding the actual shape of the second component 7B is put to the actual image 20 of the first component 7A, and therefore, assembly of the both components can be verified as a whole.

Thus, in the component assembly work support system 1 according to the embodiment, assembly is secured before actually assembling both components, as a result, assembly work can be completed smoothly in a short period of time without interrupting assembly work. Therefore, work efficiency of component assembly can be considerably improved.

Note that, although the whole of second component 7B is scanned with the three-dimensional scanner 18 so as to generate the virtual image 19 regarding the whole shape of the second component 7B in the above-stated embodiment, for example, only part of the whole of second component 7B necessary for verifying assembly may be measured with the three-dimensional scanner 18 so as to generate a virtual image regarding only the part. Namely, a range of part for generating a virtual image can be selected appropriately, provided that the reference position is correctly positioned.

Figure 5:
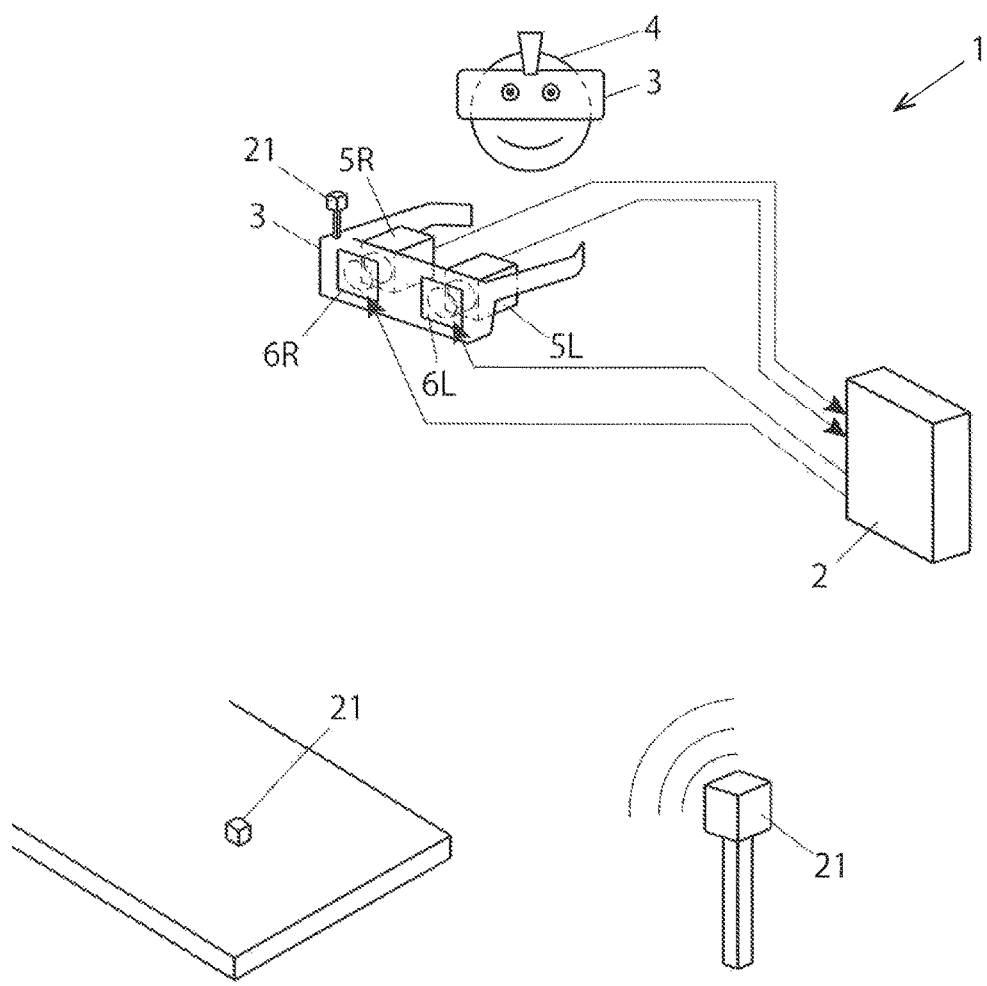
FIG. 5 is a schematic view illustrating the schematic configuration of a modified example of the component assembly work support system in FIG. 1.

FIG. 5 illustrates a modified example of the above-stated embodiment. In the above-stated embodiment, a position attitude information obtaining unit in the component assembly work support system 1 is configured by the marker member 8, the marker detecting portion 14, and the imaging portion position attitude estimating portion 15.

In the modified example, instead of this, or in addition to this, a position direction measuring device 21 for measuring the viewpoint position and the visual line direction of the worker 4 and the position of the first component 7A is provided, as illustrated in FIG. 5. As the position direction measuring device 21 of this type, for example, an ultrasonic sensor, or a magnetic/optical position measuring sensor can be used.

Also, instead of the marker for mixed reality 11 to be separately prepared as stated above, part of the first component 7A itself (for example, a corner portion as a geometric characteristic point) can also be utilized as a reference point (a kind of marker) for positioning.

Figure 6:
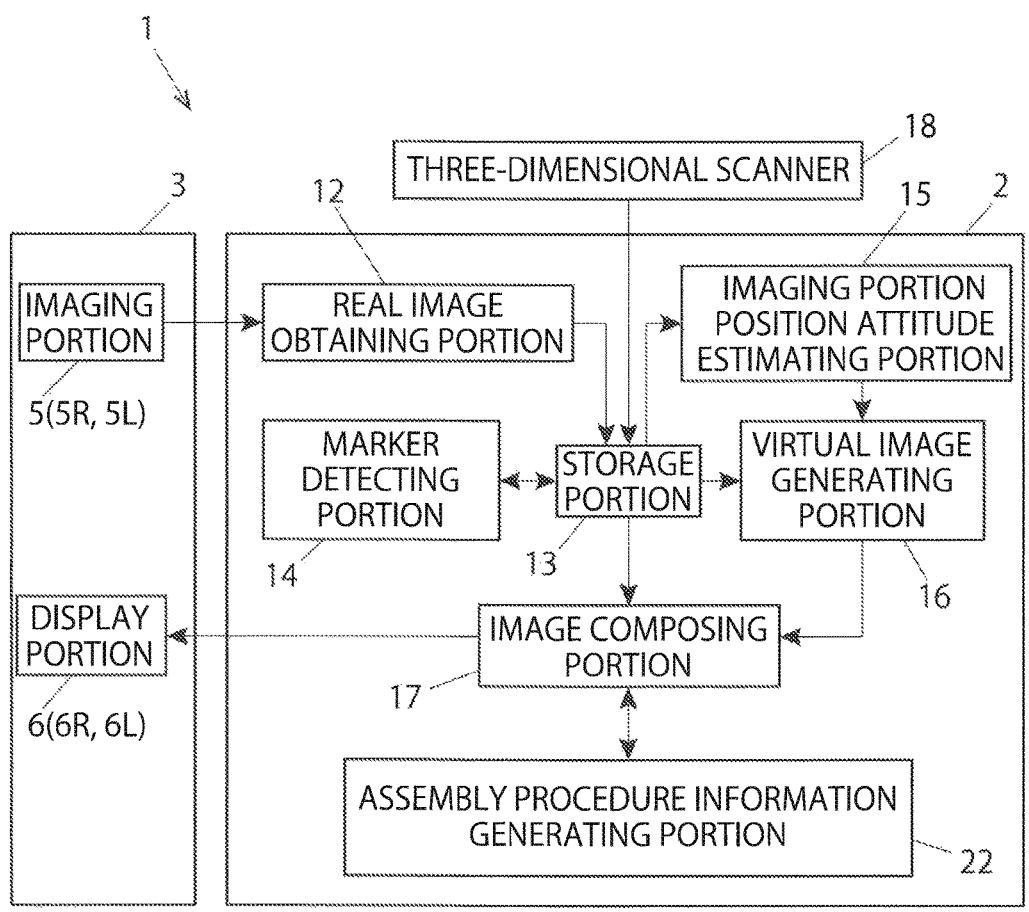
FIG. 6 is a block diagram illustrating the schematic configuration of another modified example of the component assembly work support system in FIG. 1.

FIG. 6 illustrates another modified example of the above-stated embodiment, and in the component assembly work support system 1 according to the modified example, an assembly procedure information generating portion 22 for generating assembly procedure information regarding the assembly procedure of a component is further added to the above-stated embodiment illustrated in FIG. 1.

The assembly procedure information generated in the assembly procedure information generating step is incorporated into the composite image generated by the image composing unit 17 and displayed on the display portion 6 of the HMD 3.

As types of the assembly procedure information, text information which shows the work procedure with sentences, animation information which shows the assembly procedure with video, or navigation information which indicates the next component by lighting the same can be used.

Figure 7:
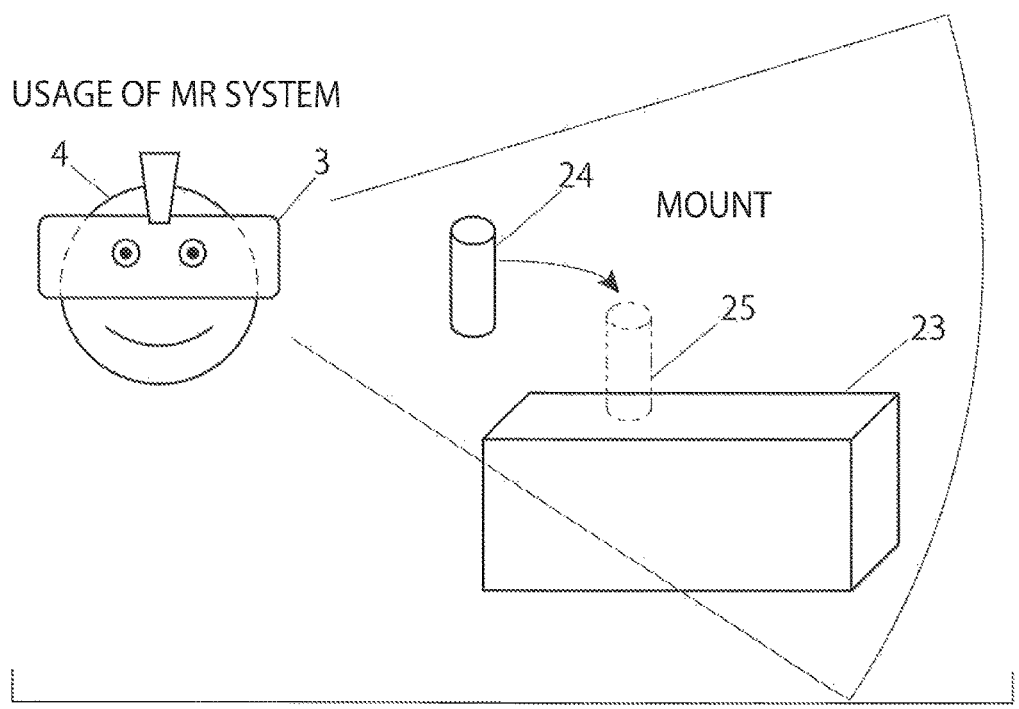
FIG. 7 is a schematic view illustrating the schematic configuration of further another modified example of the component assembly work support system in FIG. 1.

For example, as illustrated in FIG. 7, when mounting a cylindrical component 24 onto a body component 23, the word "mount" is displayed as the text information in the display portion 6 of the HMD 3, and also, a moving locus (arrow) of the cylindrical component 24 is displayed as navigation or the animation information together with a virtual image 25 of the cylindrical component after being mounted.

Here, a virtual image in actual shape of the cylindrical component 24 generated in the virtual image generating portion 16 based on the three-dimensional actual shape data of the cylindrical component 24 obtained previously with the three-dimensional scanner 18 can be used as the virtual image 25 of the cylindrical component 24 displayed on the display portion 6 of the HMD 3.

The worker 4 mounts the cylindrical component 24 on the body portion 23 while looking at the assembly procedure information which is generated in the assembly procedure information generating portion 22 and displayed on the display portion 6 of the HMD 3.

Figure 8:
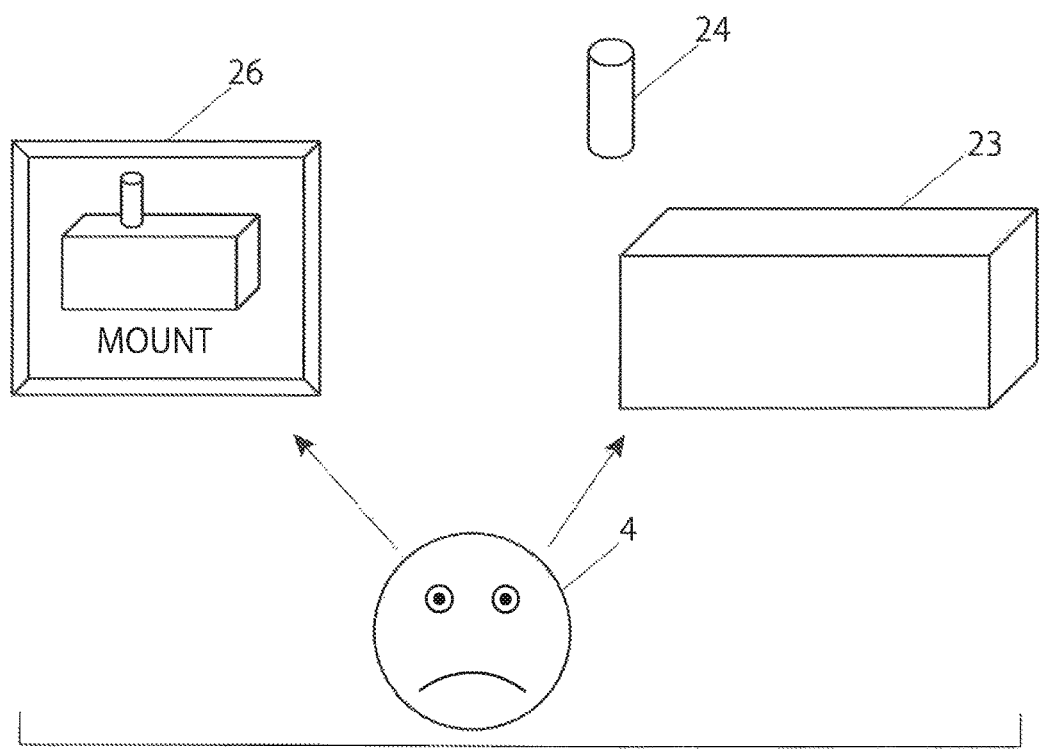
FIG. 8 is a schematic view illustrating conventional component assembly work.

In contrast, in the conventional assembly method, the worker 4 performs assembly work while comparing, with his/her eye, the work procedure displayed on the tablet terminal 26 or the like to the body component 23 and the cylindrical component 24, alternately, as illustrated in FIG. 8. Accordingly, physical or mental burden on the worker 4 increases.

On the other hand, in the component assembly work support system 1 according to the modified example, the worker 4 performs the assembly work while looking at the assembly procedure information displayed on the display portion 6 of the HMD 3 as stated above, and therefore, a work instruction and an assembly component can be checked in the same sight. Thereby, visual line movement during work can be minimized, and therefore the physical or mental burden on the worker 4 can be reduced.

Also, as various assembly procedure information that is easy for the worker 4 to understand intuitively can be displayed on the display portion 6 of the HMD 3, the burden on the worker 4 can be reduced and also certainty of work can be enhanced by preventing an assembly error. Thereby, regression work is not required, enhancing the assembly work efficiency considerably.

DESCRIPTION OF REFERENCE NUMERALS

1 . . . Component assembly work support system
2 . . . System body
3 . . . Head mount display (HMD)
4 . . . Worker
5, 5R, 5L . . . Imaging portion of HMD
6, 6R, 6L . . . Display portion of HMD
7A . . . First component (one component)
7B . . . Second component (the other component)
8 . . . Marker member (position attitude information obtaining unit)
9 . . . Frame member of marker member
10 . . . Supporting portion of marker member
11 . . . Marker
12 . . . Real image obtaining portion
13 . . . Storage portion
14 . . . Marker detecting portion (position attitude information obtaining unit)
15 . . . Imaging portion position attitude estimating portion (position attitude information obtaining unit)
16 . . . Virtual image generating portion (virtual image generating unit)
17 . . . Image composing portion (image composing unit)
18 . . . Three-dimensional scanner
19 . . . Virtual image of second component
20 . . . Real image of first component
21 . . . Position direction measuring device
22 . . . Assembly procedure information generating portion
23 . . . Body component
24 . . . Cylindrical component
25 . . . Virtual image of cylindrical component
26 . . . Tablet terminal

The invention claimed is:

1. A component assembly work support system for supporting a component assembly work, comprising:
an imaging unit configured to image a work space at a viewpoint position in a visual line direction of a worker together with an other component to which one component is to be installed;
a position attitude information obtaining unit configured to obtain position attitude information that indicates a relative position attitude relation between a viewpoint of the worker and the other component in the work space;
a virtual image generating unit configured to generate a virtual image based on data obtained by a unit that measures an actual shape of the one component at the viewpoint position in the visual line direction of the worker based on the position attitude information;
an image composing unit configured to generate a composite image by superimposing the virtual image on a real image of the other component in the work space imaged by the imaging unit to determine whether the one component and the other component fit together, based on whether there is an error in how the one component and the other component fit together before the one component and the other component are assembled without requiring the presence of both components in the same place,
wherein the error is based on whether the actual shape of the virtual image of the one component deviates from an ideal shape of the one component; and
a display unit configured to display the composite image.

2. The component assembly work support system according to claim 1, wherein the virtual image generating unit generates the virtual image based on three-dimensional actual shape data of the one component obtained by a three-dimensional scanner.

3. The component assembly work support system according to claim 1, wherein the position attitude information obtaining unit has a marker for mixed reality installed temporarily in a predetermined relative position with respect to a reference point on the other component.

4. The component assembly work support system according to claim 1, wherein the position attitude information obtaining unit has a position direction measuring device configured to measure the viewpoint position and the visual line direction of the worker and a position of the workpiece.

5. The component assembly work support system according to claim 1, further comprising: an assembly procedure information generating portion configured to generate assembly procedure information regarding a component assembly procedure, the assembly procedure information generated in the assembly procedure information generating portion being incorporated into the composite image generated by the image composing unit.

6. The component assembly work support system according to claim 1, wherein the actual shape of the virtual image of the one component deviates from the ideal shape of the one component when at least one of a machining error, a mounting error, distortion, deformation, and processing of the one component causes the shape of the one component to deviate from the ideal shape.

7. A component assembly method using a component assembly work support system for supporting a component assembly work, comprising:
an imaging step that images a work space at a viewpoint position in a visual line direction of a worker together with an other component to which one component is to be installed;
a position attitude information obtaining step that obtains position attitude information indicating a relative position attitude relation between a viewpoint of the worker and the other component in the work space;
a virtual image generating step that generates a virtual image based on data obtained by a unit that measures an actual shape of the one component at the viewpoint position in the visual line direction of the worker based on the position attitude information;
an image composing step that generates a composite image by superimposing the virtual image on a real image of the other component in the work space imaged in the imaging step to determine whether the one component and the other component fit together, based on whether there is an error in how the one component and the other component fit together before the one component and the other component are assembled without requiring the presence of both components in the same place,
wherein the error is based on whether the actual shape of the virtual image of the one component deviates from an ideal shape of the one component; and
a display step that displays the composite image.

8. The component assembly method according to claim 7, wherein the position attitude information obtaining step includes a marker installing step that temporarily installs a marker for mixed reality in a predetermined relative position with respect to a reference point on the other component.

9. The component assembly method according to claim 7, wherein the virtual image based on data obtained by the unit that measures the actual shape of the one component is fitted to a real image of the other component in the composite image projected in the display step in order to determine a quality of assembly of the one component and the other component.

10. The component assembly method according to claim 7, further comprising: an assembly procedure information generating step that generates assembly procedure information regarding a component assembly procedure, the assembly procedure information generated in the assembly procedure information generating step being incorporated into the composite image generated in the image composing step.

* * * * *